US011395493B2

(12) United States Patent
Siamon

(10) Patent No.: US 11,395,493 B2
(45) Date of Patent: Jul. 26, 2022

(54) SURFACE COATING COMPOSITIONS

(71) Applicant: Al Siamon, Nipomo, CA (US)

(72) Inventor: Al Siamon, Nipomo, CA (US)

(73) Assignee: Ai Siamon, Nipomo, CA (US)

( * ) Notice: Subject to any disclaimer, the term of this patent is extended or adjusted under 35 U.S.C. 154(b) by 0 days.

(21) Appl. No.: 17/329,797

(22) Filed: May 25, 2021

(65) Prior Publication Data

US 2022/0053767 A1  Feb. 24, 2022

Related U.S. Application Data

(63) Continuation-in-part of application No. 17/000,126, filed on Aug. 21, 2020.

(51) Int. Cl.
| | | |
|---|---|---|
| *C09D 7/40* | (2018.01) | |
| *A01N 59/26* | (2006.01) | |
| *C09D 1/00* | (2006.01) | |
| *C09D 5/00* | (2006.01) | |
| *A01M 29/34* | (2011.01) | |
| *A01N 25/24* | (2006.01) | |
| *A01N 25/04* | (2006.01) | |
| *A01N 59/00* | (2006.01) | |

(52) U.S. Cl.
CPC .............. *A01N 59/26* (2013.01); *A01M 29/34* (2013.01); *A01N 25/04* (2013.01); *A01N 25/24* (2013.01); *A01N 59/00* (2013.01); *C09D 1/00* (2013.01); *C09D 5/00* (2013.01); *C09D 7/40* (2018.01)

(58) Field of Classification Search
CPC ........ A01N 59/26; A01N 25/04; A01N 25/24; A01N 59/00; C09D 7/40; C09D 1/00; C09D 5/00; A01M 29/34
See application file for complete search history.

(56) References Cited

U.S. PATENT DOCUMENTS

| | | | |
|---|---|---|---|
| 4,828,621 | A  | 5/1989  | Siamon |
| 6,184,198 | B1 | 2/2001  | Siamon |
| 6,185,777 | B1 | 2/2001  | Siamon |
| 6,225,279 | B1 | 5/2001  | Siamon |
| 6,432,425 | B1 | 8/2002  | Siamon |
| 6,506,392 | B2 | 1/2003  | Siamon |
| 8,864,998 | B1 | 10/2014 | Siamon |
| 2009/0074878 | A1 | 3/2009 | Lea et al. |
| 2011/0015300 | A1 | 1/2011 | Whiteford et al. |

FOREIGN PATENT DOCUMENTS

| | | |
|---|---|---|
| JP | H11500162 A | 1/1996 |
| JP | 2005-179484 A | 7/2005 |
| WO | 1999066015 A1 | 12/1999 |

OTHER PUBLICATIONS

House Sale 2016.
Lea, P. et al., Ultrastructure Changes Induced by Dry Film Formation of a Trisodium Phosphate Blend, Antimicrobial Solution, The Journal of Scanning Microscopies, 25(6), 277-284, Nov. 2003.
Cleanshield—HowTo Use, Africa HEALTHSOLUTION Ltd, retrieved May 26, 2021, http://www.cleanshield.net/services.html.
International Search Report and Written Opinion of PCT/US2021/047002, dated Dec. 14, 2021.

*Primary Examiner* — Robert S Walters, Jr.
(74) *Attorney, Agent, or Firm* — Maschoff Brennan; Brent Johnson; David Old

(57) ABSTRACT

This disclosure relates to ingredients which are added to liquid paint, or coated onto dried paint, to provide benefits beyond the usual characteristics of commonly available water-based paints. More specifically, the disclosed chemistry changes the properties of the film created after application of the paint making the film harder and having anti-static properties.

15 Claims, No Drawings

SURFACE COATING COMPOSITIONS

CROSS REFERENCE TO RELATED APPLICATIONS

This application is a continuation-in-part of application Ser. No. 17/000,126, which is incorporated by reference herein in its entirety.

FIELD OF THE DISCLOSURE

This disclosure relates to coating compositions, such as compositions applied to a surface such as a wall or a ceiling.

BACKGROUND OF THE DISCLOSURE

Water-based paints have many advantages but also some notable deficiencies. For example, water-based paint tends to discolor after being applied due to aging and to the adherence of dust and other microscopic debris. It also can attract microscopic living organisms, such as bacteria. The compounds discussed in this disclosure, when added to, or coated over, a paint, greatly reduce the aforementioned deficiencies.

SUMMARY OF THE DISCLOSURE

Disclosed herein is a water-based paint product comprising: water-based paint, sodium bicarbonate, sodium carbonate, and trisodium phosphate. This water-based paint product may be used in a method of protecting a surface. This surface protection method comprises: applying a water-based paint product described herein to the surface, wherein the water-based paint product forms a film having a thickness of about 1 µm to about 2,000 µm on the surface; and allowing the water-based paint product to dry to form a protective coating; wherein the surface is a wall or a ceiling.

Some embodiments include a method of protecting a painted surface, comprising: applying a liquid to the painted surface, and allowing the liquid to dry to form a protective coating, wherein the painted surface is a wall or a ceiling, wherein the liquid is in the form of a film having a thickness of about 1 µm to about 2,000 µm, wherein the liquid comprises an aqueous solution of sodium bicarbonate, sodium carbonate, and trisodium phosphate.

One object in developing and testing this formulation was to find an additive that was inexpensive, comprised compounds that are readily available and, with proper handling, are not harmful. Another object was to have a simple and low-cost manufacturing process. Another object was to create a paint product that provides a strong film after application and can withstand varied outdoor and indoor environments. Described herein is such a formulation for an additive comprising only three compounds, all of which are added to a water-based paint. In some embodiments, the compounds are added to the paint at a moderately elevated temperature.

The accompanying description will aid in the understanding of the described features and functionality of the paint or coating product.

DETAILED DESCRIPTION

Disclosed herein is a method of rendering a surface, such as a wall, more anti-static, more resistant to accumulation of biomatter such as bacteria, viruses, mold, etc., and/or more resistant to physical or chemical damage such as photodamage, discoloration, or scratching.

This method comprises using a liquid, such as an aqueous liquid, e.g. a water-based paint product, comprising a bicarbonate, such as sodium bicarbonate, a carbonate, such as sodium carbonate, and a phosphate, such as trisodium phosphate, to apply a coating to a surface such as a wall or a ceiling. For convenience, this aqueous liquid will be referred to herein as a liquid coating composition.

The liquid coating composition, e.g. water-based paint product composition, is prepared by adding the bicarbonate, such as sodium bicarbonate, the carbonate, such as sodium carbonate, and the phosphate, such as trisodium phosphate, to an aqueous liquid. The components may be added as dry ingredients, or in aqueous solutions. The components may be added simultaneously or separately. The components may also be formed in situ. For example, sodium bicarbonate may be formed by adding solid sodium carbonate, or a sodium bicarbonate solution, followed by slowly adding phosphoric acid, such as a dilute phosphoric acid solution, to an aqueous liquid.

The liquid coating composition may be applied to a surface, such as a wall or a ceiling, by any suitable method such as spraying, brushing, fogging, etc. The liquid coating composition may then be allowed to dry to form a solid coating on the wall.

In some embodiments, the liquid coating composition may be applied so that it covers at least about 60%, at least about 70%, at least about 80%, at least about 90%, at least about 95%, or at least 99% of a painted surface, such as a wall or a ceiling.

In some embodiments, the liquid coating composition is in the form of a film, such as a film having a thickness of about 0.1-2,000 µm, about 0.1-100 µm, about 100-200 µm, about 200-300 µm, about 300-400 µm, about 400-500 µm, about 200-500 µm, about 500-1,000 µm, or about 1,000-2,000 µm.

In some embodiments, the liquid coating composition is a paint, which dries so that the solid coating is in the form of a paint. Alternatively, the liquid coating composition may be a non-paint composition, which dries so the solid coating is colorless and/or clear. The liquid coating composition may be applied to an already painted surface to cover the paint on the surface. This may render the already painted surface more anti-static, more resistant to accumulation of biomatter such as bacteria, viruses, mold, etc., and/or more resistant to physical or chemical damage such as photodamage, discoloration, or scratching.

The solid coating described herein is anti-static, preventing dust particles from picking up a charge. Dust particles will, therefore, not remain suspended in the air but will drop to the floor of a room having the solid coating on the walls and ceiling. Similarly, because the solid coating is anti-static, insects and spiders are not able to stay on the surface of a wall or ceiling that has been coated with a composition described herein.

The solid coating may be in the form of a thin film, such as a film having a thickness of 0.1-10 µm, about 0.1-2 µm, about 2-4 µm, about 4-7 µm, about 7-10 µm, or about 3 µm film. The film is very strong. For example, it may be stronger than steel at the same thickness.

The solid coating has no aggressive properties and is not harmful to humans.

A solid coating in the form of a paint, also referred to herein as infused paint, has many other surprising qualities. The infused paint, when dry on the painted surface, is much harder than other paints of comparable quality and composition. Also, the adhesion of the infused paint is much higher than with comparable paints. It is well known that paint naturally discolors over time, but the infused paint discolors at a much slower rate. It has been found that, over a three-month period of time the infused paint showed no discoloration at all. For example, a new coat of infused paint was applied over a portion of a previous coat of infused paint and the new infused paint layer matched the prior coat perfectly. When the infused paint is applied with an airless sprayer, the over spray is reduced by over 90%. All of these advantages are accomplished when standard paint is infused with the ingredients disclosed herein.

The solid coating described herein has a number of health benefits. For example, people with asthma or bronchial problems would be able to sleep and live much better because the dust level in a room coated with the solid coating described herein would be greatly reduced. The infused paint can be applied to surfaces in a hospital, making for much safer environment, including in an operating room. When the infused paint is applied, a film is formed impeding the growth of bacteria and the adherence of foreign materials such as dust and mold. A surface painted with the infused paint is also more thoroughly cleanable, an advantage in any environment producing toxins or other undesirable biological or inert materials.

The ingredients may be added to the liquid in the following amounts:
1. bicarbonate of soda ($NaHCO_3$ or sodium bicarbonate), in an amount that is about 5-67%, about 5-10%, about 10-16%, about 14-18%, about 16-25%, about 25-35%, about 35-45%, about 45-55%, about 55-67%, or about ⅙ of the total weight of $NaHCO_3$, $Na_2CO_3$, and $Na_3PO_4$;
2. soda ash ($Na_2CO_3$ or sodium carbonate), in an amount that is about 16-67%, about 16-25%, about 25-35%, about 35-45%, about 45-55%, about 55-67%, or about ⅓ of the total weight of $NaHCO_3$, $Na_2CO_3$, and $Na_3PO_4$; and
3. trisodium phosphate ($Na_3PO_4$), in an amount that is about 16-67%, about 16-25%, about 25-35%, about 35-45%, about 45-55%, about 55-67%, or about ½ of the total weight of $NaHCO_3$, $Na_2CO_3$, and $Na_3PO_4$.

In some embodiments, the weight ratio of sodium bicarbonate to sodium carbonate to trisodium phosphate is about 1 to 2 to 3. In some embodiments, the weight ratio of sodium bicarbonate to sodium carbonate is about 0.9-1.1 to 1.8-2.2. In some embodiments, the weight ratio of sodium bicarbonate to trisodium phosphate is about 0.9-1.1 to 2.7-3.3. In some embodiments, the weight ratio of sodium carbonate to trisodium phosphate is about 1.8-2.2 to 2.7-3.3.

Any suitable amount of the bicarbonate, such as sodium bicarbonate, the carbonate, such as sodium carbonate, and the phosphate, such as trisodium phosphate may be added to the aqueous liquid. In some embodiments, the total amount of the bicarbonate, such as sodium bicarbonate, the carbonate, such as sodium carbonate, and the phosphate, such as trisodium phosphate, may be about 0.0001-0.001 moles/L, about 0.001-0.01 moles/L, about 0.01-1 moles/L, about 0.01-0.1 moles/L, about 0.1-0.2 moles/L, about 0.2-0.3 moles/L, about 0.3-0.4 moles/L, about 0.4-0.5 moles/L, about 0.5-0.6 moles/L, about 0.6-0.7 moles/L, about 0.7-0.8 moles/L, about 0.8-0.9 moles/L, about 0.9-1 moles/L, about 0.09-0.11 moles/L, about 0.01-0.3 moles/L, about 0.3-0.6 moles/L, about 0.6-1 moles/L, about 0.1-0.3 moles/L, about 0.2-0.4 moles/L, about 0.4-0.8 moles/L, about 0.8-2 moles/L, about 0.001-0.004 moles/L, about 0.004-0.007 moles/L, about 0.007-0.01 moles/L, or about 0.0059 moles/L. In some embodiments, the total amount of the bicarbonate, such as sodium bicarbonate, the carbonate, such as sodium carbonate, and the phosphate, such as trisodium phosphate is 85 grams, or about three ounces, per gallon (or about 0.09 moles/L of sodium bicarbonate, about 0.07 moles/L of sodium carbonate, and about 0.05 moles/L of trisodium phosphate, for a total of about 0.2 moles/L of the three components). In some embodiments, the total weight of the bicarbonate, such as sodium bicarbonate, the carbonate, such as sodium carbonate, and the phosphate, such as trisodium phosphate is about 0.09-0.1 ounces/gal (or about 0.018 ounces/gal of sodium bicarbonate, about 0.035 ounces/gal of sodium carbonate, and about 0.052 ounce/gal of trisodium phosphate), or about 0.06-0.08% by weight.

In some embodiments, the bicarbonate, such as sodium bicarbonate is present at a concentration of about 0.001-0.005 ounces/gal, about 0.005-0.03 ounces/gal, about 0.01-0.02 ounces/gal, about 0.02-0.03 ounces/gal, about 0.03-0.06 ounces/gal, about 0.06-0.1 ounces/gal, about 0.1-2 ounces/gal, about 0.1-0.5 ounces/gal, about 0.5-1.5 ounces/gal, about 0.9-1.1 ounces/gal, about 1-2 ounces/gal, about 2-4 ounces/gal, about 0.3 ounces/gal, about 0.01-0.03 ounces/gal, about 0.012-0.024 ounces/gal, about 0.009-0.036 ounces/gal, about 0.015-0.02 ounces/gal, or about 0.018 ounces/gal.

In some embodiments, the carbonate, such as sodium carbonate is present at a concentration of about 0.005-0.05 ounces/gal, about 0.05-0.1 ounces/gal, about 0.02-0.04 ounces/gal, about 0.04-0.1 ounces/gal, about 0.1-0.2 ounces/gal, about 0.2-2 ounces/gal, about 0.2-0.5 ounces/gal, about 0.5-1.5 ounces/gal, about 0.5-0.7 ounces/gal, about 0.9-1.1 ounces/gal, about 1-2 ounces/gal, about 2-4 ounces/gal, about 0.6 ounce/gal, about 0.024-0.048 ounces/gal, about 0.02-0.06 ounces/gal, about 0.018-0.072 ounces/gal, about 0.03-0.04 ounces/gal, or about 0.035 ounces/gal.

In some embodiments, the phosphate, such as trisodium phosphate is present at a concentration of about 0.005-0.1 ounces/gal, about 0.01-0.05 ounces/gal, about 0.5-2 ounces/gal, about 0.4-1.5 ounces/gal, about 0.8-1 ounces/gal, about 1-2 ounces/gal, about 2-4 ounces/gal, about 0.01-0.04 ounces/gal, about 0.03-0.06 ounces/gal, about 0.04-0.06 ounces/gal, about 0.06-0.1 ounces/gal, about 0.9 ounce/gal, about 0.03-0.09 ounces/gal, about 0.036-0.072 ounces/gal, about 0.027-0.0108 ounces/gal, about 0.045-0.06 ounces/gal, or about 0.053 ounces/gal.

These three ingredients may be added in close time proximity to each other, such as within about five seconds, within about 10 seconds, within about 30 seconds, within about 1 minute, within about 5 minutes, within about 30 minutes, or within 1 hour of one another, or may be added simultaneously, in any order, to a water-based paint. Mixing may be done at ambient temperature, or with heating, such as within a range of room temperature to approximately 120 degrees F., in approximately equal proportions. The quantities of the three ingredients are adjusted depending on the quantity of water-based paint to which the ingredients will be added. The sodium bicarbonate, sodium carbonate and trisodium phosphate may be combined, e.g. dissolved in water, prior to their addition to the water-based paint and then added to the water-based paint as a single mixture. Alternatively, a water-based paint product may be prepared by adding paint components, such as pigments, polymers, solvents, etc., to a liquid containing the bicarbonate (e.g. sodium bicarbonate), the carbonate (e.g. sodium carbonate), and the phosphate (e.g. sodium phosphate). Generally, the components of the water-based paint product may be added to the mixture in any suitable order.

In some embodiments, an aqueous liquid or solution containing the three components may be added to the paint, e.g. at a volume of about 1-10% of the total paint volume. For example, about 5-10 ounces of the liquid may be added about a gallon of paint.

EXAMPLE 1

The interior glass walls of a glass aquarium measuring about 15"×24"×15" were sprayed with an aqueous solution containing about 0.2-0.3% sodium bicarbonate, about 0.4-0.5% sodium carbonate, and about 0.6-0.7% trisodium phosphate by weight, and allowed to dry. One of the 4 interior walls was then washed with water and dried with a clean towel to remove all of the deposited solid film.

Mosquitoes procured from Carolina Biological were then placed in the aquarium. Approximately 1.5 quarts of water (part of packaging method of mosquitoes) was also placed in the aquarium, covering the bottom of the aquarium with about ½ inch depth of water. The top of the aquarium was covered with saran wrap which inhibited escape of mosquitoes from enclosed environment of aquarium.

Eight (8) live mosquitoes within minutes settled as follows: Five mosquitoes settled upon the untreated surface for minutes at a time. Two mosquitoes settled on the untreated saran wrap "roof" of the enclosure. One mosquito settled on one of the treated walls.

This general condition (with small variations) continued for about the first 45 minutes of time. The majority of the mosquitoes displayed a preference for the untreated surface. On a few occasions, two to three (2-3) mosquitoes would fly around the enclosed area but not land until finally landing on the water itself.

After the first 45-minute period, the enclosure developed an internal mist/fog resulting from internal condensation created by temperature variation of the inside vs. outside of the aquarium, reducing visibility inside the aquarium. During the next hour, 2-3 more mosquitoes began to display an increasing willingness to land on more of the treated surfaces.

Twelve hours later (in which the internal mist/fog condition persisted), the mosquitoes continued to display the increased willingness to land on the treated surfaces. 3-4 mosquitoes remained on the untreated surface with 3-4 now willing to land on the treated surfaces as well. This is believed to be due to the mist on the walls removing the film on the walls of the aquarium.

EXAMPLE 2

Under the supervision of the inventor, inventor's house was painted with water-based paints that included about 0.01-0.02 ounces of sodium bicarbonate, about 0.02-0.04 ounces of sodium carbonate, and about 0.03-0.06 ounces of trisodium phosphate per gallon of water-based paint. The surfaces of the house were observed by the inventor on a regular basis. After about ten years, the number of insects, spiders, or spider webs that had been observed on any of the painted surfaces was minimal.

EXAMPLE 3

Prior to painting, dust particles were measured in a room. Over a three-day average, the room had an average of about 7,000 parts per million of particles having a particle size of 3 µm and about 400 parts per million of particles having a particle size of about 10 µm. After the room was painted, the room had a reduction of over 80% in these particles with an average of about 1,300 parts per million of particles having a particle size of 3 µm and about 75 parts per million of particles having a particle size of about 10 µm.

EXAMPLE 4

The following is an interview with painters who used paint prepared by mixing an aqueous solution containing about 0.2-0.3% sodium bicarbonate, about 0.4-0.5% sodium carbonate, and about 0.6-0.7% trisodium phosphate by weight with commercial paint before applying the paint. About 5-10 ounces of aqueous solution was added per gallon of paint. Repetition and verbal pauses are removed.

Question: Tell me what you know about the paint?

Answer: The paint flows are real nice.

Question: When you sprayed the walls, was there any overspray?

Answer: There was no overspray.

Question: How much time do you think you saved on the job?

Answer: At least two days, each.

Question: And during these two days each, how many hours did you have for a total job? How many days?

Answer: Four days, five days, and we did it in what three.

Question: And what about the odor, was there any paint odor?

Answer: No odors, it smelled like fresh.

Question: And how about your ceilings, boy that really is nice looking ceilings.

Answer: There's no marks, no nothing. No roller marks, no back rolling, we didn't need to do any of that, it just sprayed on, you can spray a take and it just flows in.

Question: And how well do you like it?

Answer: It's actually really, really good. It's a really good product.

Question: Would you recommend it to your fellow painters.

Answer: Yeah, we already did.

Volunteered comment by painter: On the walls, if you scratch something, you can touch it, and when you touch it doesn't no, no lines. Also, you can touch up with the brush, and there will be no brush marks in it.

Question/Comment: Yeah, I know, that's quite remarkable. I've seen that before.

Answer: Yeah, same texture, you can't tell where you touch up with the brush and where you spray. Yeah, it's that good.

Question: Have you ever seen that in anything that you've ever used before?

Answer: No, not something that I have used.

Question: Have you ever heard of anything like this?

Answer: Nope.

While the above description contains many specifics, these should not be construed as limitations on the scope of the disclosure, but rather as an exemplification of the embodiments therein. It is to be understood that the invention is not limited to these specific embodiments. Accordingly, the invention is not limited to the precise embodiments described in detail hereinabove. With respect to the claims, it is applicant's intention that the claims not be interpreted in accordance with the sixth paragraph of 35 U.S.C. § 112 unless the term "means" is used followed by a functional statement. Further, with respect to the claims, it should be understood that any of the claims described below may be combined for the purposes of the invention.

The invention claimed is:

1. A water-based paint product comprising:
   a water-based paint,
   about 0.01 ounces to about 0.02 ounces of sodium bicarbonate per gallon of water-based paint,
   about 0.02 ounces to about 0.04 ounces of sodium carbonate per gallon of water-based paint, and
   about 0.03 ounces to about 0.06 ounces of trisodium phosphate per gallon of water-based paint, wherein a weight ratio of the sodium bicarbonate, the sodium carbonate, and the trisodium phosphate is about 1:2:3.

2. The water-based paint product of claim 1, wherein the water-based paint product is prepared by mixing an aqueous solution containing sodium bicarbonate, sodium carbonate, and trisodium phosphate with the water-based paint.

3. The water-based paint product of claim 1, wherein the water-based paint is heated to between ambient temperature and 170 degrees Fahrenheit prior to adding sodium bicarbonate, sodium carbonate, and trisodium phosphate.

4. The water-based paint product of claim 3, wherein sodium bicarbonate, sodium carbonate and trisodium phosphate are added to the water-based paint in any order prior to cooling of the water-based paint to ambient temperature.

5. The water-based paint product of claim 1, wherein the water-based paint is not heated prior to adding sodium bicarbonate, sodium carbonate, and trisodium phosphate.

6. The water-based paint product of claim 1, wherein the water-based paint product further comprises a pigment, which is added to an aqueous solution comprising sodium bicarbonate, sodium carbonate, and trisodium phosphate.

7. The water-based paint product of claim 1, wherein the water-based paint is heated to about 120 degrees Fahrenheit prior to adding sodium bicarbonate, sodium carbonate, and trisodium phosphate.

8. The water-based paint product of claim 1, wherein sodium bicarbonate, sodium carbonate and trisodium phosphate are added simultaneously to the water-based paint.

9. The water-based paint product of claim 1, wherein sodium bicarbonate, sodium carbonate and trisodium phosphate are separately added to the water-based paint in any order within five minutes of each other.

10. The water-based paint product of claim 1, wherein sodium bicarbonate, sodium carbonate and trisodium phosphate are combined prior to their addition to the water-based paint and then added to the water-based paint as a single mixture.

11. The water-based paint product of claim 1, wherein sodium bicarbonate, sodium carbonate and trisodium phosphate are added to the water-based paint within one hour of each other; and the water-based paint has a temperature between ambient temperature and 170 degrees F. when sodium bicarbonate, sodium carbonate and trisodium phosphate are added to the water-based paint.

12. A method of protecting a surface, comprising: applying the water-based paint product of claim 1 to the surface, wherein the water-based paint product forms a film having a thickness of about 1 µm to about 2,000 µm on the surface; and allowing the water-based paint product to dry to form a protective coating; wherein the surface is a wall or a ceiling; wherein the water-based paint comprises water, sodium bicarbonate, sodium carbonate, and trisodium phosphate.

13. The method of claim 12, wherein the protective coating covers at least 90% of the surface.

14. A water-based paint product comprising:
   a water-based paint,
   about 0.01 ounces to about 0.02 ounces of sodium bicarbonate per gallon of water-based paint,
   about 0.02 ounces to about 0.04 ounces of sodium carbonate per gallon of water-based paint, and about 0.03 ounces to about 0.06 ounces of trisodium phosphate per gallon of water-based paint.

15. The water-based paint product of claim 14, wherein the water-based paint product is prepared by mixing an aqueous solution containing sodium bicarbonate, sodium carbonate, and trisodium phosphate with the water-based paint.

* * * * *